April 23, 1968  J. P. BANNER  3,379,122
PLASTIC LAMINATING APPARATUS
Filed Sept. 28, 1965  3 Sheets-Sheet 1
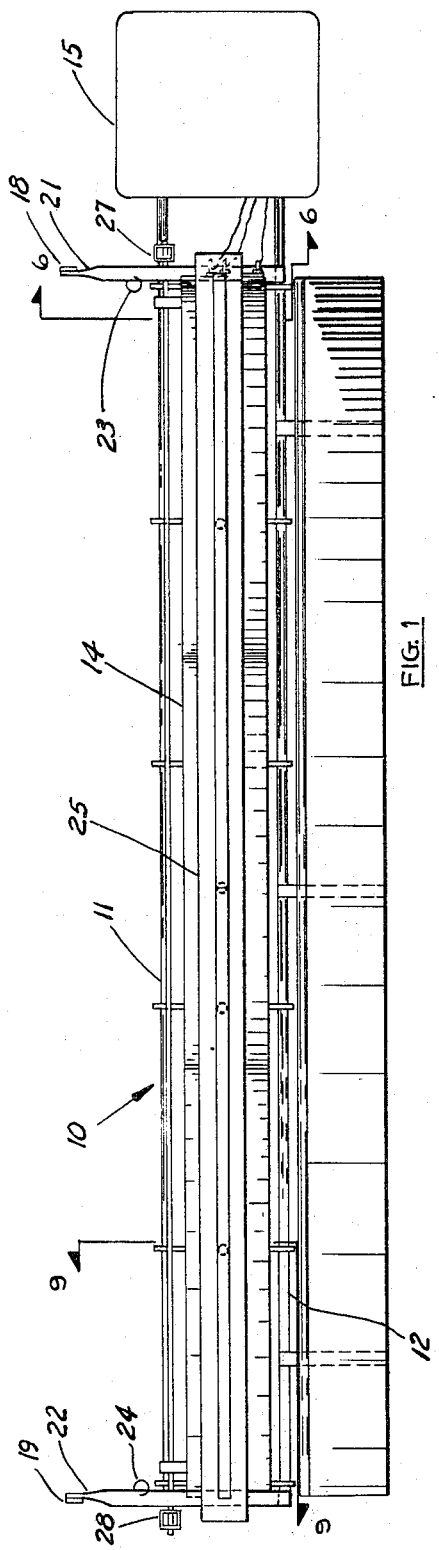
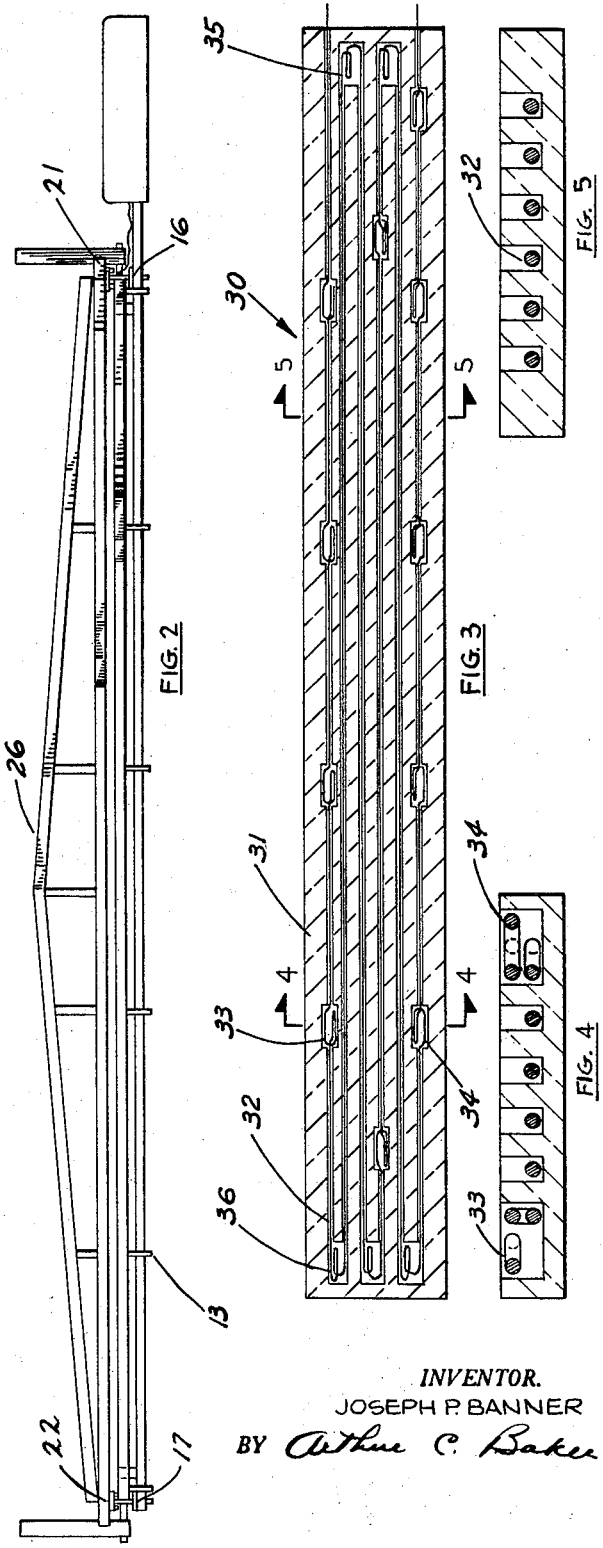
INVENTOR.
JOSEPH P. BANNER
BY Arthur C. Baker

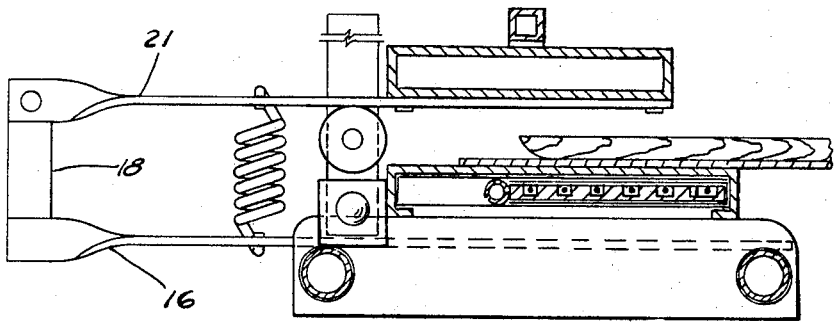
FIG. 6
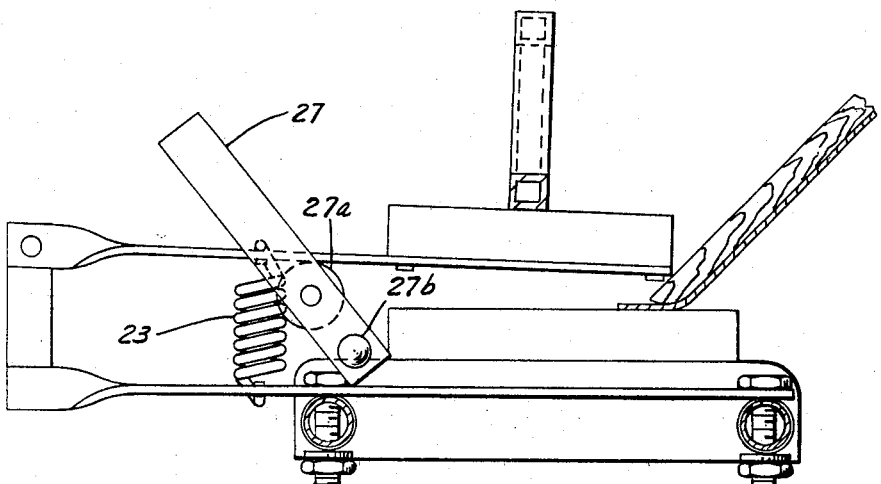
FIG. 7
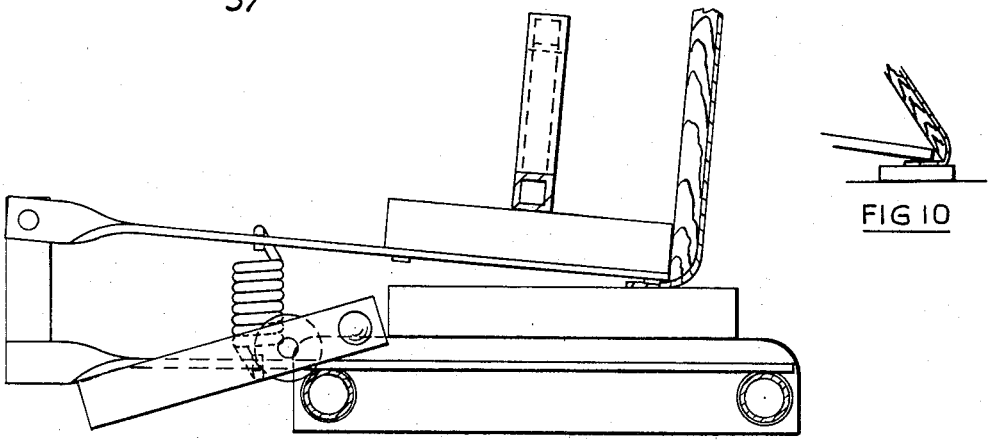
FIG. 8
FIG 10
INVENTOR.
JOSEPH P. BANNER April 23, 1968

J. P. BANNER 3,379,122

PLASTIC LAMINATING APPARATUS

Filed Sept. 28, 1965

INVENTOR
JOSEPH P. BANNER
BY *Arthur R. Baker*

United States Patent Office 3,379,122
Patented Apr. 23, 1968

3,379,122
PLASTIC LAMINATING APPARATUS
Joseph P. Banner, 2550 N. Venice,
Tucson, Ariz. 85716
Filed Sept. 28, 1965, Ser. No. 490,847
1 Claim. (Cl. 100—93)

This invention relates to the application of surfacing materials of plastic laminate such as Formica, Textolite, Micarta, etc., and more particularly relates to the application of such plastic laminates to contoured and radial surfaces. The invention is shown herein as embodied in a novel radius or contour forming laminating apparatus.

The veneering of plastic laminates to a variety of core materials has reached a high state of development. The laminates are usually applied to a base of flakeboard or plywood to provide a veneered surface, characterized by good appearance, durability, high wear resistance, and resistance to stains and heat from ordinary sources.

The plastic laminate is bonded to the base material by a suitable adhesive, and the desired end is to secure a uniform, intimate contact and bond between the laminate and its core or base. This is no longer difficult when plastic laminate is applied to level surfaces.

However, when plastic laminates are to be applied to radial surfaces, especially radial surfaces of small diameters, it is necessary to bend the laminate sharply and to maintain contact between the laminate and radial surface until the bond is complete. This is somewhat more difficult, and until now, no simple inexpensive means or device has been available for this purpose. It has therefore been necessary to employ rather expensive complicated devices, which though effective for the purpose, are large and bulky, and which cannot be moved about without great difficulty.

It is accordingly an object of the invention to provide an improved apparatus for laminating plastic laminates to contoured or radial surfaces.

It is a further object of the invention to provide an improved plastic laminator which is inexpensive to manufacture.

It is a further object of the invention to provide an improved plastic laminator which is light and completely portable, which may be set up on any work bench and used as an in-shop or on-the-job tool.

It is a further object of the invention to provide an improved plastic laminator having means to control laminating temperatures very precisely and means for the maintenance of a high unit laminating pressure during the laminating operation, so that fast efficient permanent radial edges may be formed on surfaces with very short radii.

It is a further object of the invention to provide the combination of a heating element and associated heat control means, whereby the temperature of every area of the surface of the heating platen may be maintained equal and constant within very close limits and whereby the temperature of every area of the heating platen may continue to be maintained equal and constant despite uneven dissipation of heat when the laminator is being used.

In general it is contemplated that the apparatus of the instant invention is an improvement in plastic laminators in that it has a relatively low initial cost; it is simply constructed, and there will be negligible cost for maintenance and every likelihood of long life; it is completely portable and may be set up wherever needed; and it may be employed to form radial edges with very short radii.

The invention will be best understood from a consideration of the following detailed description taken in connection with the accompanying drawings forming part of this specification, with the understanding, however, that the invention is not confined to any strict conformity with the showing of the drawings, but may be changed or modified so long as such changes or modifications mark no material departure from the salient features of the invention.

In the drawings:

FIG. 1 is a top plan view of the laminating apparatus in accordance with the invention;

FIG. 2 is a view of the laminating apparatus in side elevation;

FIG. 3 is a top plan view of the heating element which is shown removed from the heating platen cover;

FIG. 4 is a view in cross section taken on line 4—4 of FIG. 3;

FIG. 5 is a view in cross section taken on line 5—5 of FIG. 3;

FIG. 6 is a view in cross section taken generally on line 6—6 of FIG. 1, showing a piece of work having a radial edge, positioned for the commencement of a laminating operation;

FIG. 7 is an end view illustrating an intermediate stage of a laminating operation;

FIG. 8 is an end view similar to FIG. 7, illustrating a terminal stage of a laminating operation;

FIG. 10 is a schematic view to illustrate overbending of the plastic laminate.

Figure 9:
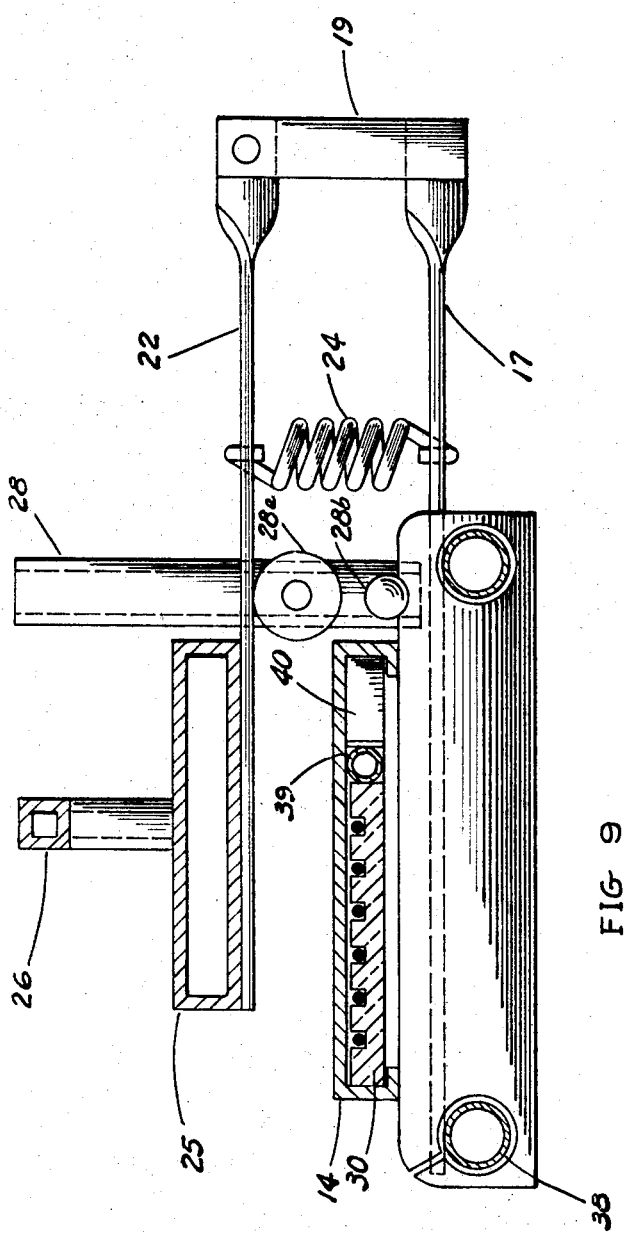
FIG. 9 is a view in cross section taken on line 9—9 of FIG. 1.

Referring now to the drawings, laminating apparatus in accordance with the invention generally designated as 10 on FIG. 1 may include two longitudinal rod members 11 and 12 and a number of associated transverse rib members designated by 13. The transverse rib members may support a heating platen 14, which may include a heating element 30, a heat sensor 39, and a number of spring spacer mechanisms as shown at 40. Two upper transverse members 21 and 22 may carry a pinch pressure plate 25 and handle 26 and may be pivotally attached as shown to two upright members 18 and 19. Two lower transverse members 16 and 17 may be fixedly attached as shown to the two upright members 18 and 19. A spring 23 may interconnect transverse members 16 and 21, and a spring 24 may interconnect transverse members 17 and 22. Lifting lever 27 having a bearing wheel 27a may be pivoted as shown at 27b, and lifting lever 28 having a bearing wheel 28a may be pivoted as shown at 28b.

Longitudinal rod members 11 and 12 may be bolted at each end to the two lower transverse members 16 and 17 in the manner shown at 37 in FIG. 7. However, in order to allow for longitudinal expansion when platen 14 is heated, platen 14 and rib members 13 may be free to move with relationship to rod members 11 and 12, this relationship being indicated at 38 of FIG. 9.

In FIG. 3, the numeral 30 designates a heating element which may include an insulator core 31. The core 31 may be grooved and cut out as shown in FIGS. 4 and 5, to receive resistance wire 32 and to accommodate a multiplicity of loops in the resistance wire, such as indicated at 33 and 34.

It is an important aspect of the invention to arrange the resistance wire and resistance loops in the wire in the manner illustrated in FIG. 3. Thus, as illustrated, proximate the ends of the insulator core 31, the loops are grouped in the manner shown at 35 and 36 of FIG. 3; whereas, in that part of the insulator core 31 not proximate the ends, the loops are arranged relatively symmetrically. It has been found that this arrangement is effective first to allow the heating platen temperature to be set and controlled within very close limits; and second to facilitate the maintenance of even and identical temperatures on all surfaces and in all areas of the heating platen, even when laminating operations are in progress and heat is being dissipated. It should be clearly understood that although in the latter case when there may be a greater withdrawal of heat from some areas of the heating platen than from other areas, through this arrangement of wires and loops in the insulator core, these areas are not allowed to cool below the temperature of other areas from which there may be less withdrawal of heat.

The operation of the apparatus may be understood by reference to FIGS. 6, 7, and 8. As illustrated, pinch pressure plate 25 may be raised into position above heating platen 14. The heating platen 14 may then be preheated to a desired laminating temperature. With the pressure plate 25 raised the work may be introduced and positioned with the laminate contacting the heating platen 14, and the radial edge of the work positioned downwardly directed as shown.

Pinch pressure plate 25 may then be brought down upon the work by operation of one of the lever handles 27 or 28. The work may then be withdrawn slowly by hand, in the manner indicated and through the path shown in FIGS. 7 and 8. During such withdrawal, there is obviously an interreaction between the pinch pressure plate 25 and the top of the heating platen 14, which serves to maintain a constant temperature and a high unit pressure on the laminate, and thus the formation of a strongly bonded permanent laminated radial edge is insured.

It should be clearly understood that during the laminating operation as described, there is an incremental bending of the laminate, which bending is effected without breaking the laminate, but which bending is effective to impart a permanent radial set to the laminate about the surface of the radial edge to be laminated. This incremental bending is carried to the point of overbending, which is illustrated in FIG. 10. It is believed to be clear that by imparting this permanent set to the laminate, and by overbending the laminate about the radial edge, the adhering of the laminate to the edge is most positively accomplished, and all tendency of the laminate to spring away from the radial edge is removed. A bond is thus formed which will be permanent and will not fail.

While the present invention has been disclosed in connection with a specific embodiment thereof, it is to be understood that this is by way of example rather than by way of limitation, and that the invention is to be defined by the attendant claims which should be given a scope as broad as is consistent with the prior art.

What is claimed is:

1. A plastic laminating apparatus of the character described comprising two spaced-apart upright support members, two lower transverse members, each of said lower transverse members having one end fixedly attached to one of said upright support members, two upper transverse members, each of said upper transverse members having one end movably attached to one of said upright support members, two longitudinally extending rod members, one end of each of said rod members being fixedly attached to one of said lower transverse members, and another end of each of said rod members being fixedly attached to the other of said lower transverse members, a multiplicity of spaced-apart transverse rib members, said rib members being slidably related with said rod members, a longitudinally extending heating platen carried by said transverse rib members, a longitudinally extending pinch clamping member fixedly supported at each end by one of said upper transverse members, two coil springs, each spring being anchored to one of said lower transverse members, and each spring being attached to one of said upper transverse members, means including two lifting levers for controlling the tension of said coil springs, and temperature control means associated with said heating platen.

References Cited
UNITED STATES PATENTS

| | | | |
|---|---|---|---|
| 2,313,968 | 3/1943 | Reich. | |
| 2,379,357 | 6/1945 | Humphrey | 100—93 |
| 2,644,151 | 6/1953 | Krueger | 100—93 |
| 2,652,095 | 9/1953 | Cahill | 100—93 |
| 2,714,732 | 8/1955 | Traettino | 100—93 |
| 3,012,601 | 12/1961 | Lee | 100—93 X |
| 3,106,630 | 10/1963 | Klamp | 100—93 |
| 3,196,068 | 7/1965 | Schoder et al. | 100—583 X |

LOUIS O. MAASSEL, *Primary Examiner.*